June 22, 1954     J. MAURICE     2,681,579
ELECTROMAGNETIC CHANGE-SPEED GEAR
Filed Feb. 18, 1952
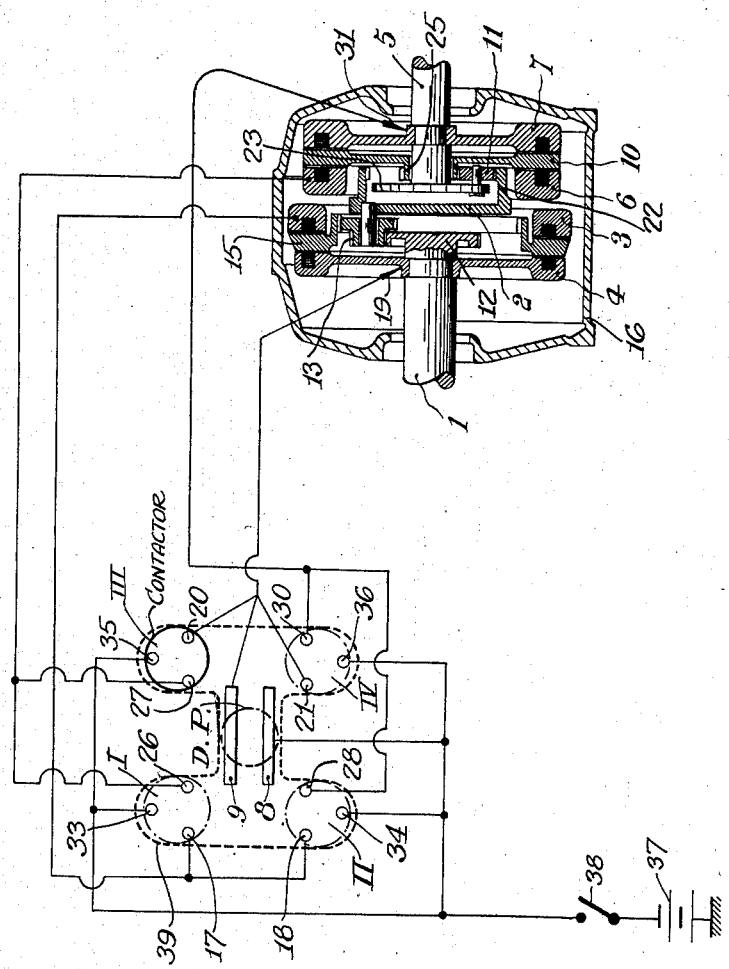
INVENTOR
JEAN MAURICE
BY *Robert E. Burns*
ATTORNEY Patented June 22, 1954

2,681,579

UNITED STATES PATENT OFFICE 2,681,579

ELECTROMAGNETIC CHANGE-SPEED GEAR

Jean Maurice, Paris, France, assignor to Societe Anonyme Francaise du Ferodo, Paris, France Application February 18, 1952, Serial No. 272,161

Claims priority, application France February 19, 1951

4 Claims. (Cl. 74—761)

The present invention has for its object an improvement in the operation of electromagnetic change-speed gears.

A serious inconvenience with such gears, which comprise epicyclic gear trains of which the planet wheel carrying frames, the gear rings and the sun wheels can be coupled with fixed or movable electromagnets, resides in the fact that they include rotatable members the inertia of which is comparatively high. The consequences of such a high inertia make themselves felt when the driver of a vehicle on which the gear is mounted is gearing up from dead point to first, then to second gear, and so on. The transmission gear is subjected to a jerk which may result in bouncing the vehicle forwards. Such a bouncing is particularly frequent in mechanisms including a hydraulic clutch since such an apparatus is designed to transmit a low torque even when running at a slow speed.

The present invention affords a simple way of remedying the aforementioned inconvenience and of making an automobile rid of such jerks.

The invention is concerned principally with an arrangement adapted, in the dead point position of the gear-selecting lever, so as to energize one of the electromagnets in the change-speed gear as to obtain the desired speed ratios between the various epicyclic trains instead of allowing them to idle uncontrolled consequent to such variable actions as the viscosity of the oil, the frictional resistances encountered, and so on, and this, in order to obtain, when gearing up or down, that the various inertia in the change-speed gear and the dragging torque transmitted by the hydraulic clutch will offset one another without reacting upon the transmission gear of the vehicle.

An embodiment of the invention is illustrated diagrammatically and by way of example in the appended figure.

The change-speed gear shown is of the 4-speed type and comprises two epicyclic gears mounted in series. The input shaft 1 is firm with a sun gear 12 which meshes with the planet wheels 13 of a planet-carrier 2 coaxial with shaft 1. The planet-wheels 13 are in mesh with an internally toothed ring 15 coaxial with the shaft 1. A fixed electromagnet 3, firm with the housing 16 of the change-speed gear, is arranged on the right of the toothed ring 15. Another electromagnet 4 integral with the input shaft 1 is arranged on the left of said ring 15. The energizing circuit of the electromagnet 3 is earthed at one end and is connected at the other end with the studs 17, 18. The energizing circuit of the rotatable electromagnet 4 is earthed at one end and is connected at the other end with the contact studs 9, 20, 21, through a brush-and-slip-ring device 19 diagrammatically shown.

In series with the first epicyclic gear just described is mounted a second epicyclic gear. The second gear comprises: first an internally toothed annulus 22, coaxial with the shaft 1, and integral with the planet carrier 2 of the first epicyclic gear; second, a planet-carrier 23 integral with the output shaft 5 of the change-speed mechanism, this planet-carrier being provided with planet wheels 11 in mesh with the toothed annulus 22; and third, a sun-wheel 25 mounted freely rotatable about the output shaft 5. This sun wheel 25 is integral with a sun disc 10 having a suitable moment of inertia. The left side of this sun-disc can be engaged by a fixed electromagnet 6 secured to the housing 16. On the right side of the sun disc 10 is mounted an electromagnet 7, which is rigid with the output shaft 5. The energizing circuit of the fixed electromagnet 6 is earthed at one end, and is connected at the other end with the studs 26, 27. The energizing circuit of the rotatable electromagnet 7 is earthed at one end, and is connected at the other end to the studs 28, 30 through a brush-and-slip-ring device 31 diagrammatically shown.

Five feeding studs 33, 34, 35, 36, and 8, connected to the battery 37 through an interrupter 38, are provided in the neighbourhood of the already mentioned studs. The other terminal of the battery 37 is earthed.

A control contactor secured to the gear-selecting lever (not shown) of the change-speed mechanism and displaceable inside a guide 39 is adapted to engage simultaneously and to electrically connect to each other:

In a first position I, the studs 17, 26 and 33.
In a second position II, the studs 18, 28 and 34.
In a third position III, the studs 20, 27 and 35.
In a fourth position IV, the studs 21, 30 and 36.
In a fifth intermediate position, or dead position D. P., the studs 8 and 9.

The operation of the apparatus is as follows:

In each of the four positions I, II, III, IV, the contactor energizes one electromagnet in each of both epicyclic gears and gives a different transmission ratio between the input shaft 1 and the output shaft 5.

Thus, in position I, the electromagnets 3 and 6 are energized. In the first epicyclic gear, the toothed ring 15 is then fixed, and this results in a rotation of the planet carrier 2 at reduced speed. In the second epicyclic gear, the sun disc 10 and the sun wheel 25 are then fixed, and this results in a rotation of the output shaft at reduced speed with regard to the planet carrier 2. The final transmission ratio is the product of the reduced speed ratios of each epicyclic gear.

In position II, the electromagnets 3 and 7 are energized. In the first epicyclic gear, the planet carrier 2 is rotated at reduced speed. In the second epicyclic gear, the sun disc 10 and the sun wheel 25 are then made integral with shaft 5 and carrier 23. Accordingly, the planet wheels 11 are locked integral with their carrier 2, and this results in the actuating of the thus formed rigid assembly by the annulus 22 of carrier 2 at the same speed as this carrier. In other terms, the transmission ratio of the whole mechanism is the reduced speed ratio of the first epicyclic gear.

In position III of the switch, the electromagnets 4 and 6 are energized. The electromagnet 4 makes the ring 15 integral with the input shaft 1. Consequently, the shaft 1, the ring 15, the sun-wheel 12, the planet-wheels 13 and the planet-carrier 2 are locked together and are rotated integral with the input shaft 1. In the second epicyclic gear, the sun-disc 10 and the sun wheel 25 are then fixed, and the output shaft is accordingly rotated at the reduced speed ratio of the first epicyclic gear. This ratio is different, and in fact greater than the reduced ratio of the first epicyclic gear.

In position IV, the electromagnets 4 and 7 are energized. The carrier 2 is locked integral with the input shaft 1. The output shaft is locked integral with the toothed annulus 22 of the carrier 2. This results in a rotation of shaft 5 integral with shaft 1, that is in a direct drive.

In the fifth position D. P., the only electromagnet 4 is energized. Accordingly, the ring 15, the planet wheels 12 and the planet carrier 2 are locked integral with the input shaft 1. If the vehicle is at standstill, the output shaft 5 is held at rest. The planet carrier 23 is accordingly held at rest, and equally the axles of the planet wheels 11. It results therefrom that when the input shaft 1 is actuated by the residual torque of the clutch, the internally toothed ring 22, rotating integral with the input shaft 1 and in mesh with the planet wheels 11, actuates these planet wheels 11 in the same direction of rotation, and that these planet wheels rotate the sun wheel 25 and the sun disc 10 in the reverse direction, at a higher speed than the annulus 22 and the input shaft 1.

As the driver shifts to first gear all the revolving masses are instantaneously stopped and, owing to the fact that they are rotated in opposite directions and that their inertiae are substantially equal in view of the ratios between the rotational speeds, they offset one another and only cause the planet wheels 11 to rotate without acting upon the planet wheel carrying frame which is connected with the output shaft; consequently, no impulse is transmitted to the vehicle.

What I claim is:

1. A change speed mechanism comprising: an input shaft and an output shaft; a first epicyclic gear comprising a driving member integral in rotation with the input shaft, a lockable member, and a driven member, a first electromagnet adapted to render the lockable member and the driven member of said first gear integral in rotation with the input shaft, and a second electromagnet adapted to hold stationary the lockable member of said first gear and to rotate thus the driven member with a reduced gear ratio; a second epicyclic gear including a driving member integral in rotation with the driven member of the first gear, a lockable member, and a driven member integral with the output shaft, said lockable member of the second gear being adapted to rotate in the direction opposite to that of the driving member of the same gear when the driven member is being held stationary, a first electromagnet adapted to render the driving member and the lockable member of the second gear integral in rotation with the output shaft, and a second electromagnet adapted to hold stationary the lockable member of the second gear and to rotate thus the output shaft with a reduced gear ratio with regard to the driving member of the second gear; four sets of contacts connected to the energizing circuits of the electromagnets, each set of contacts being adapted, when its contacts are connected with each other, to energize simultaneously one electromagnet of the first gear and one electromagnet of the second gear, the four said sets of contacts corresponding respectively to the four possible combinations of one electromagnet of the first gear with one electromagnet of the second gear, and accordingly to four transmission ratios between the input shaft and the output shaft; a fifth set of contacts connected to the energizing circuit of the first electromagnet of the first gear and corresponding to neutral position, and means to connect with each other the contacts of each set successively, said fifth set of contacts making electrical connections, when its contacts are connected with each other, to energize only the first electromagnet of the first gear, which results, when the output shaft and the driven member of the second gear integral therewith are being held stationary and when the input shaft is being rotated, in driving together with said input shaft all the members of the first gear and the driving member of the second gear, and in rotating in the reverse direction the lockable member of the second gear; whereby the inertia of the lockable member of the second gear counteracts that of the members rotating with the input shaft when selected ones of said electromagnets are energized to provide driving connections between said input and output shafts.

2. A change speed mechanism comprising: an input shaft and an output shaft; a first epicyclic gear comprising a driving member integral in rotation with the input shaft, a lockable member, and a driven member, a first electromagnet adapted to render the lockable member and the driven member of said first gear integral in rotation with the input shaft and a second electromagnet adapted to hold stationary the lockable member of said first gear and to rotate thus the driven member with a reduced gear ratio, a second epicyclic gear having an internally toothed ring integral in rotation with the driven member of the first gear and coaxial with the output shaft, a freely rotatable sun wheel coaxial with the output shaft, a planet carrier integral with said output shaft and having planet wheels meshing simultaneously with said sun wheel and with said toothed ring, a sun disc integral in rotation with said sun wheel, a first electromagnet adapted to render said toothed ring and said sun wheel integral in rotation with the planet carrier and the output shaft, and a second electromagnet adapted to hold stationary the sun wheel and the sun disc integral therewith, and to rotate thus the output shaft with a reduced gear ratio with regard to the toothed ring; four sets of contacts connected to the energizing circuits of the electromagnets, each set of contacts being adapted, when its contacts are connected with each other, to energize simultaneously one electromagnet of the first gear and one electromagnet of the second gear, the four said sets of contacts corresponding respectively to the four possible combinations of one electromagnet of the first gear with one electromagnet of the second gear, and accordingly to four transmission ratios between the input shaft and the output shaft; a fifth set of contacts connected to the energizing circuit of the first electromagnet of the first gear and corresponding to neutral position, and means to connect with each other the contacts of each set successively, said fifth set of contacts making electrical connections when its contacts are connected with each other, to energize only the first electromagnet of the first gear, which results, when the output shaft and the planet carrier integral therewith are being held stationary and when the input shaft is being rotated, in driving together with said input shaft all the members of the first gear and the toothed ring of the second gear, and in rotating in the reverse direction the sun wheel of the second gear and the sun disc integral therewith; whereby the inertia of the lockable member of the second gear counteracts that of the members rotating with the input shaft when selected ones of said electromagnets are energized to provide driving connections between said input and output shafts.

3. A change speed mechanism comprising: an input shaft and an output shaft; a plurality of epicyclic gears arranged in series between said input shaft and said output shaft, said plurality of epicyclic gears including a plurality of electromagnets adapted for establishing connections between determined members of said gears and for holding stationary determined members of said gears; among the epicyclic gears a last gear including a driving member integral in rotation with the driven member of the last but one gear, a lockable member, and a driven member integral with the output shaft, said lockable member of the last gear being adapted to rotate in the direction opposite to that of the driving member of the same gear when the driven member is being held stationary, a first electromagnet adapted to render the driving member and the lockable member of the last gear integral in rotation with the output shaft, and a second electromagnet adapted to hold stationary the lockable member of the second gear and to rotate thus the output shaft with a reduced gear ratio with regard to the driving member of the second gear; a plurality of sets of contacts connected to the energizing circuits of the different electromagnets of the mechanism, each set of contacts being adapted when its contacts are connected with each other to selectively energize the electromagnets corresponding to one of the gear ratios of the mechanism; an additional set of contacts connected to the energizing circuits of the epicyclic gears other than those of the last gear and corresponding to neutral position, and means to connect with each other the contacts of each set successively, said additional set of contacts making electrical connections, when its contacts are connected with each other, to cause a positive actuation in rotation of the driven member of the last but one epicyclic gear and of the driving member of the last gear, which results, when the output shaft and the driven member of the last gear integral therewith are being held stationary, and when the input shaft is being actuated in rotation, in rotating in the direction opposite to that of the driving member of the last gear the lockable member of said last gear, whereby the inertia forces of oppositely rotating members counteract each other when selected ones of said electromagnets are energized to provide driving connections between said input and output shafts.

4. A change speed mechanism comprising: an input shaft and an output shaft; a plurality of epicyclic gears arranged in series between said input shaft and said output shaft, said plurality of epicyclic gears including a plurality of electromagnets adapted for establishing connections between determined members of said gears and for holding stationary determined members of said gears; among the epicyclic gears a last gear comprising an internally toothed ring integral in rotation with the driven member of the last but one epicyclic gear and coaxial with the output shaft, a freely rotatable sun wheel coaxial with the output shaft, a planet carrier integral with said output shaft and having planet wheels meshing simultaneously with said sun wheel and with said toothed ring, a sun disc integral in rotation with said sun wheel, a first electromagnet adapted to render said toothed ring and said sun wheel integral in rotation with the output shaft, and a second electromagnet adapted to hold stationary the sun wheel and the sun disc integral therewith, and to rotate thus the output shaft with a reduced gear ratio with regard to the toothed ring; a plurality of sets of contacts connected to the energizing circuits of the different electromagnets of the mechanism, each set of contacts being adapted when its contacts are connected with each other to selectively energize the electromagnets corresponding to one of the gear ratios of the mechanism; an additional set of contacts connected to the energizing circuits of the epicyclic gears other than those of the last gear and corresponding to neutral position, and means to connect with each other the contacts of each set successively, said additional set of contacts making electrical connections, when its contacts are connected with each other, to cause a positive actuation in rotation of the driven member of the last but one epicyclic gear and of the toothed ring integral therewith, which results, when the output shaft and the planet carrier integral therewith are being held stationary and when the input shaft is being actuated in rotation, in rotating in the direction opposite to that of said toothed ring the sun wheel of the last gear and the sun disc integral therewith, whereby the inertia forces of oppositely rotating members counteract each other when selected ones of said electromagnets are energized to provide driving connections between said input and output shafts.

References Cited in the file of this patent

UNITED STATES PATENTS

| Number | Name | Date |
|---|---|---|
| 2,078,130 | Edwards | Apr. 20, 1937 |
| 2,084,522 | Cotal | June 22, 1937 |
| 2,395,459 | Carnagua | Feb. 26, 1946 |